United States Patent [19]

Shiota

[11] Patent Number: 5,036,402
[45] Date of Patent: Jul. 30, 1991

[54] PHOTOGRAPHIC PRINTER, VIDEO IMAGE AND FILM IMAGE PRINTING APPARATUS

[75] Inventor: Kazuo Shiota, Kanagawa, Japan

[73] Assignee: Fuji Photo Film Co., Ltd., Kanagawa, Japan

[21] Appl. No.: 501,349

[22] Filed: Mar. 28, 1990

Related U.S. Application Data

[63] Continuation of Ser. No. 207,825, Jun. 17, 1988, abandoned.

[30] Foreign Application Priority Data

Jun. 19, 1987 [JP] Japan .................. 62-152982
Jun. 29, 1987 [JP] Japan .................. 62-99926[U]

[51] Int. Cl.$^5$ .................. H04N 5/84; H04N 5/59; G11B 7/24
[52] U.S. Cl. .................. 358/244; 355/20; 358/76
[58] Field of Search .................. 358/244, 255, 244.1, 358/244.2, 346, 180, 107, 226, 75, 76, 77, 74; 355/20; 346/110; 354/76, 77

[56] References Cited

U.S. PATENT DOCUMENTS

| | | |
|---|---|---|
| 3,256,388 | 6/1966 | Miller .................. 355/20 |
| 3,781,466 | 12/1973 | Brown .................. 358/226 |
| 4,191,962 | 3/1980 | Sramek .................. 358/244 |
| 4,264,168 | 4/1981 | Baliozian .................. 354/77 |
| 4,473,849 | 9/1984 | Cool .................. 358/244 |
| 4,569,572 | 2/1986 | Kopich .................. 358/255 |
| 4,575,766 | 3/1986 | Birnbaum et al. .................. 358/244 |
| 4,604,647 | 8/1986 | Peele .................. 358/74 |
| 4,616,926 | 10/1986 | DiPietro et al. .................. 358/244 |
| 4,709,271 | 11/1987 | Yamaguchi et al. .................. 358/244 |
| 4,730,214 | 3/1988 | Lambert et al. .................. 358/244 |
| 4,769,715 | 9/1988 | Feldman et al. .................. 358/244 |
| 4,780,756 | 10/1988 | Shiota et al. .................. 358/244 |
| 4,786,972 | 11/1988 | Kashiwagi .................. 358/244 |
| 4,876,567 | 10/1989 | Yamaguchi et al. .................. 355/20 |

Primary Examiner—Roy N. Envall, Jr.
Assistant Examiner—Huy Nguyen
Attorney, Agent, or Firm—Sughrue, Mion, Zinn, Macpeak & Seas

[57] ABSTRACT

A photographic printer having a video image printing system for making a print of a video image displayed on a CRT and a photographic image printing system using the CRT as an illumination light source for a film from which a photographic image is printed. A control circuit varies the deflection angle of the CRT yoke to define a narrowed raster area on the CRT screen in accordance with various sizes of films.

13 Claims, 8 Drawing Sheets

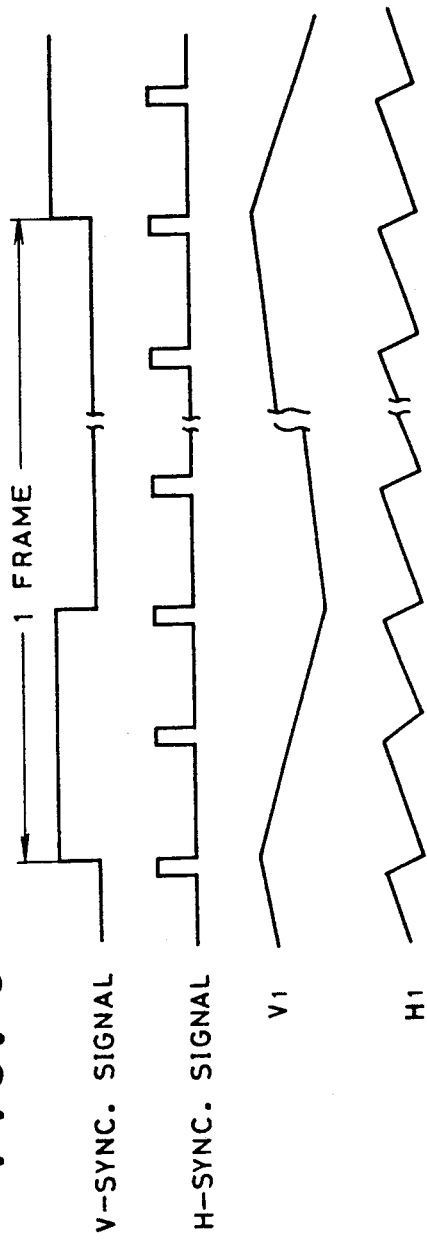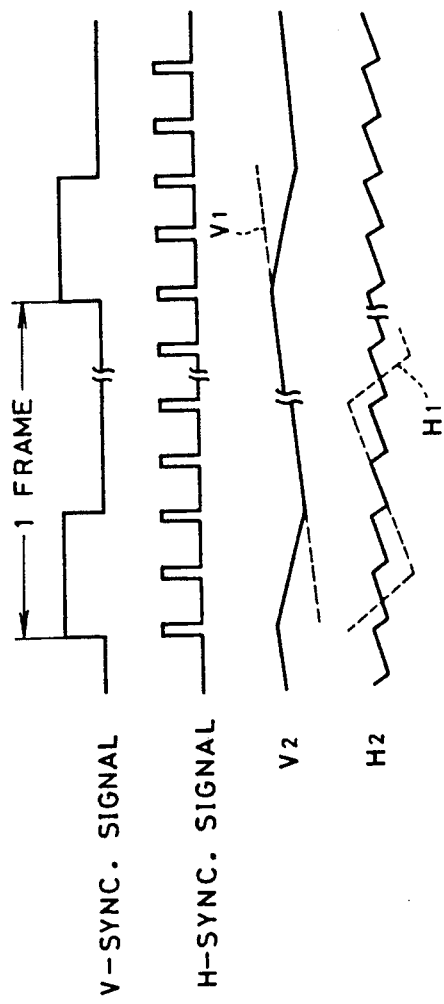

PHOTOGRAPHIC PRINTER, VIDEO IMAGE AND FILM IMAGE PRINTING APPARATUS

This is a continuation of application Ser. No. 07/207,825 filed June 17, 1988 now abandoned.

BACKGROUND OF THE INVENTION

The present invention relates to a photographic printer and more particularly to a photographic printer which can make prints of video images and of photographic images.

There are photographic printers for selectively printing on a photographic paper a video image such as a CRT image displaying on a phosphor screen and a photographic image recording on a photographic film. One such photographic printer which is disclosed in, for example, Japanese Patent Unexamined Publication (Kokai) No. 58-122,529, is provided with a lamp unit incorporating therein a printing lens, a negative carrier, a condenser lens, color correction filters, and a white light source. A photographic paper, movable in the horizontal direction, is provided over the lamp unit. Between the lamp unit and the photographic paper, there is a CRT unit which is removably insertable into the printing path of the photographic printer. This CRT unit comprises a CRT, a color filter assembly in a turret disk, a printing lens, and a reflection mirror for directing an image displayed on the CRT downward to the photographic paper. In the case of printing a photographic image formed in a film, for example, a color negative film, the lamp unit is used while the CRT unit is removed from the printing path. On the other hand, in the case of printing a video image, the CRT unit is inserted into the printing path and an image on the CRT is printed on the photographic paper in three-color sequential exposure.

One problem with such photographic printers is that the CRT unit, which generally is heavy, has to be set in the printing path every time a video image is printed. This setting of the CRT unit is quite troublesome.

In an attempt at avoiding the troublesome setting operation of such conventional photographic printers, there has been proposed a photographic printer which is disclosed in, for example, Japanese Patent Unexamined Application No. 61-246,980, in which a CRT unit for video image printing is stationarily disposed therein. In such a photographic printer, the CRT is used as a light source for illuminating a film from which a print of a photographic image is made.

The photographic printers for selectively printing video images on a CRT and a photographic image formed in a film need a large CRT whose screen is usually between five and nine inches to provide a sharp image of print of a video image. A video image is displayed on a whole area of the CRT screen and is reduced for video image printing. When the large size CRT is used as a printing light source for photographic image printing, light is emitted over the whole area of the CRT screen.

When a large CRT having, for example, a seven inch screen is used as a printing light source to illuminate a 35 mm-size format of film which has an image area of approximately 24×36 mm (the most popular photographic film), about 90 percent of illumination light emanating from the CRT is unused. In addition to such inefficient use of illumination light from the CRT, because the luminance of the CRT is lower than that of halogen lamps generally used in photographic printers, a long exposure time is required for photographic image printing.

SUMMARY OF THE INVENTION

In view of the foregoing deficiencies, it is an object of the present invention to provide a photographic printer with a CRT in which an exposure of a photographic image can be effected in a short exposure time by increasing brightness of the CRT and utilizing CRT light more effectively.

To accomplish the above and other objects, the present invention provides a photographic printer having a video image printing system for making prints of video images displayed on a CRT and a photographic image printing system using the CRT as an illumination source for making prints of film images, the CRT being incorporated with deflection angle varying means for varying the deflection angle of an electron beam so as to decrease the raster area on the CRT when the photographic image printing system is used.

According to one feature of the present invention, the raster area on the CRT can be varied to match various sizes of image areas of films. Because light emitted from the entire raster area of the CRT thus is used more efficiently, and because the narrowing of the raster enables the quantity of light emitted from the CRT, the luminance of the CRT is greatly increased, resulting in a shorter exposure time for a photographic image printing and the ability to use a CRT having lower luminance.

The photographic printer preferably is provided with a light collecting means such as a mirror box removably disposed between the CRT and a film when the photographic image printing system is selected. With the provision of the light collecting tube, the light emitting from the CRT is efficiently used to illuminate the film uniformly. This also enables use of a CRT of lower luminance. It is preferable to use light shielding means such as a tube for preventing ambient light in the working room from entering the video image printing system. The light shielding means may be painted black on an inner surface thereof.

BRIEF DESCRIPTION OF THE DRAWINGS

FIG. 6 is a graph showing signal waveforms provided by a second deflection yoke control circuit:

FIG. 7 is a graph showing signal waveforms provide by a second deflection yoke control circuit:

DETAILED DESCRIPTION OF THE PREFERRED EMBODIMENTS

Figure 1:
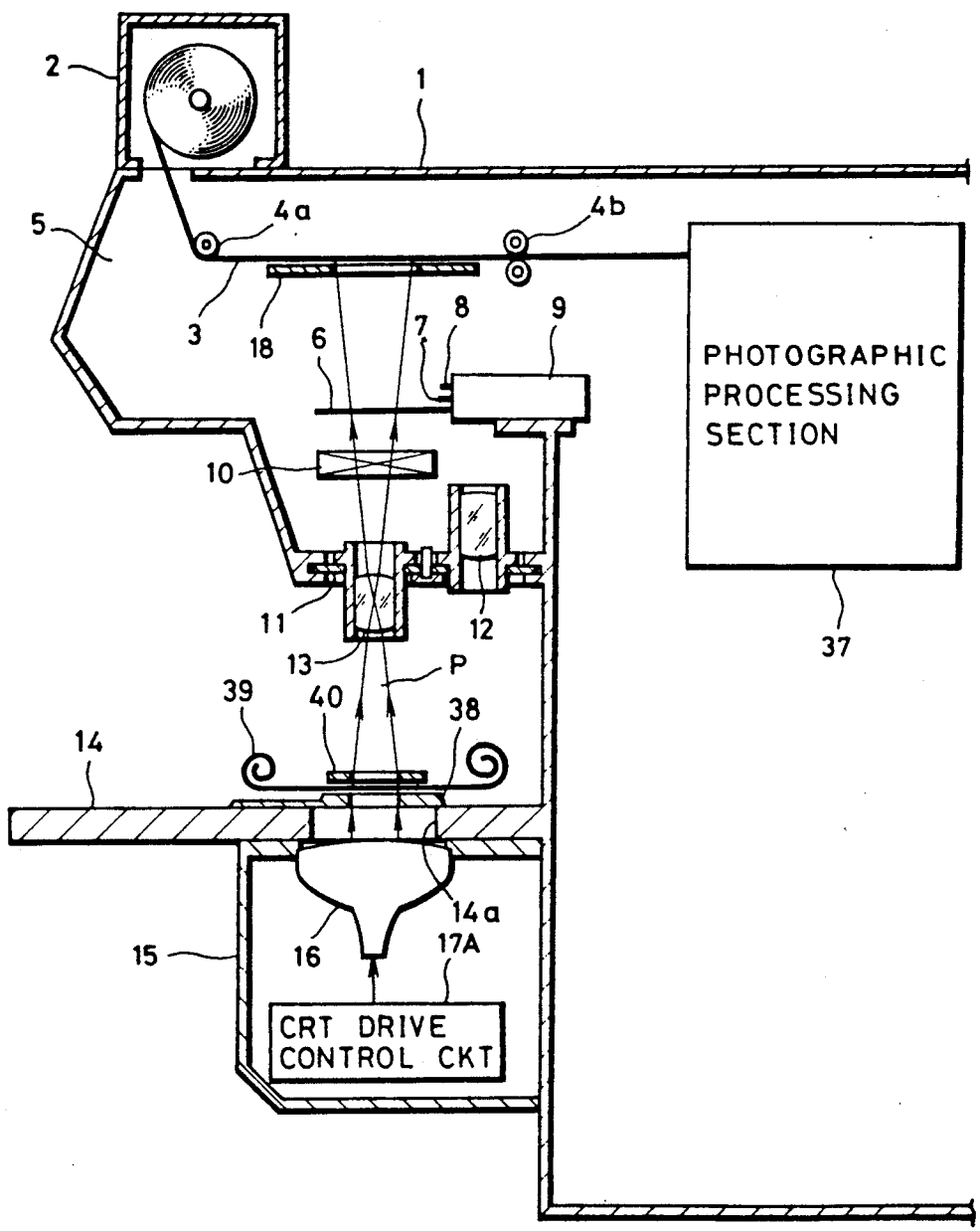
FIG. 1 shows a cross section of a photographic printer according to a preferred embodiment of the present invention in which a photographic image printing system is selected.

FIG. 1 shows a photographic printer for selectively printing a video image and a photographic image. The printer is in a photographic image printing mode. As shown, the photographic printer 1 has a magazine 2 which is detachably mounted at the top of the photographic printer 1 and contains a photographic material such as a color photographic paper 3 rolled therein. The color photographic paper 3 is intermittently withdrawn from the magazine 2 by a pair of rollers 4a and 4b and moved into an exposure chamber 5 to be placed in an exposure position or station formed by a masking frame 18. Below the masking frame 18 but in the exposure chamber 5, there are three color filters 6, 7, and 8, namely red, green and blue filters, controlled by a filter changer 9; a shutter 10; and a turret disk 11 with a video image printing lens 12 to reduce the size of a CRT video image and a photographic image printing lens 13 to enlarge the size of the photographic image on the film.

At a lower portion of the photographic printer 1, there is provided under the exposure chamber 5 a CRT unit 15 in which a CRT 16 is disposed with its phosphor or display screen placed parallel to the color photographic paper 3 in the exposure position. This CRT unit 15 is driven by a CRT drive control circuit 17A which will be described in detail with regard to FIG. 3. The photographic printer 1 is provided with a working table 14 which contacts the upper frame of the CRT 16. To allow light emanating from the CRT 16 to travel toward the lens turret disk 11, the working table 14 has an opening 14a. In this embodiment, a high-resolution black-and-white CRT preferably is used to provide high print image quality.

Figure 3:
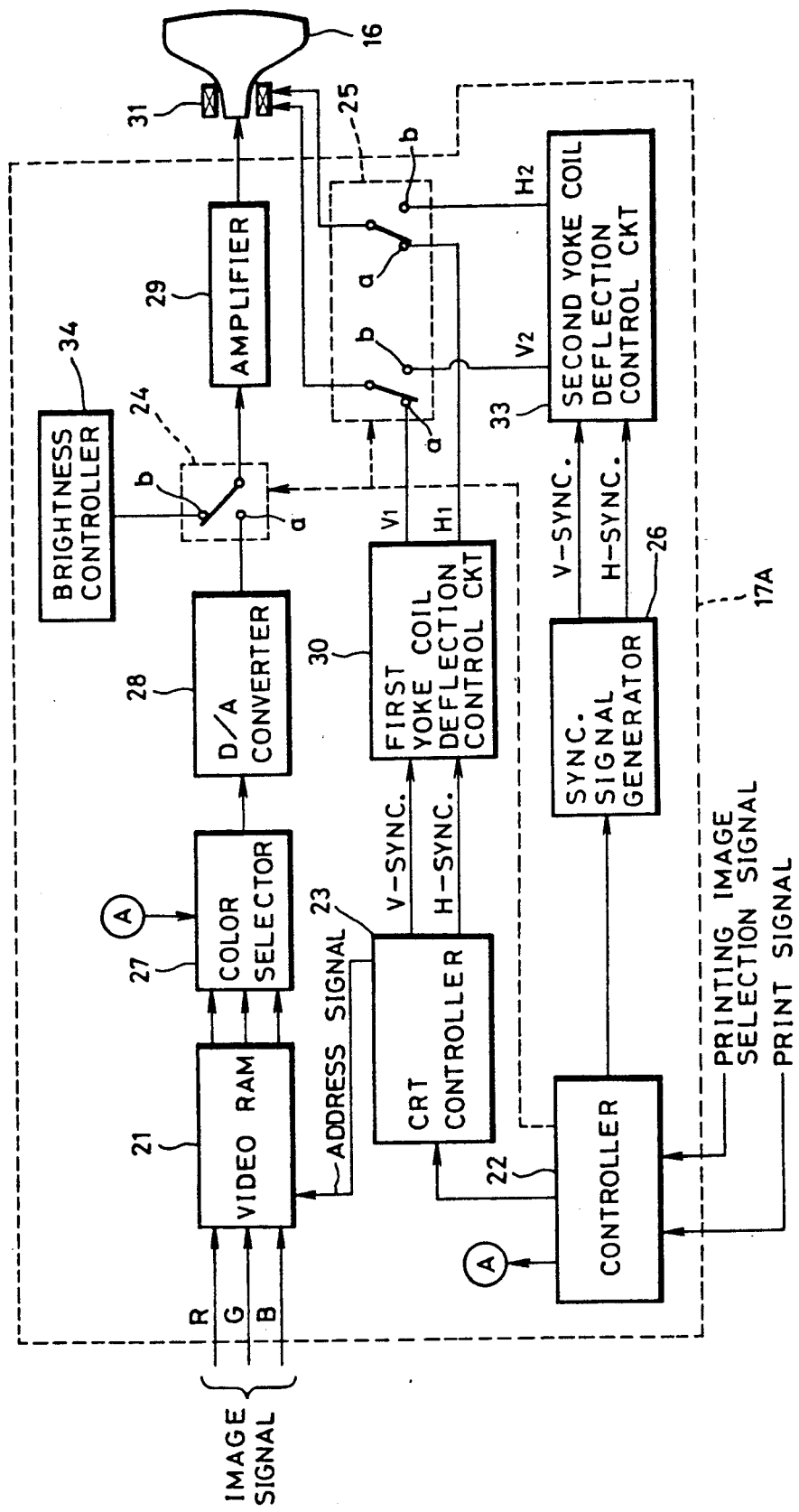
FIG. 3 is a block diagram showing a CRT drive circuit.

As shown in FIG. 3, the CRT drive control circuit 17A includes a video RAM 21 to which a video image input device (not shown) is connected to provide three color image signals for a single frame of negative image. For example, when a color TV camera is used for the video image input device to take three color image signals of a subject, the three color image signals are subjected to analog-to-digital conversion, negative-positive conversion, and/or color correction before being written in the video RAM 21. If three color image signals of a color negative image such as are formed in a color negative film are to be taken these may be written in the video RAM without being subjected to negative-positive conversion. Negative image signals of a computer graphic image made by a digitizer or of a character image or the like input by means of a keyboard may be written directly after image processing in the video RAM 21. Composite image signals of the computer graphic image and the character image also may be written. If using a color reversal photographic paper instead of a usual color photographic paper 3, a positive image is written in the video RAM 21.

Responsive to a printing mode selection signal provided through a keyboard (not shown), a controller 22 selects a printing mode, namely a video image printing mode or a photographic image printing mode. When the video image printing mode is selected, the controller 22 causes a CRT controller 23 to operate, at the same time bringing the switches 24 and 25 into switching position a. On the other hand, in the case of selecting the photographic image printing mode, the controller 22 causes synchronizing signal generating circuit 26 to generate synchronizing signals for the CRT 16, at the same time bringing the switches 24 and 25 into switching position b.

The CRT controller 23 comprises a clock generator and a plurality of counters and produces address signals, and horizontal and vertical synchronizing signals. With the address signals, the video RAM is accessed to read out three color image signals written in respective memory cells thereof and thereafter to transfer these signals to a color selector 27. The color selector 27 is controlled by the controller 22 to transmit, in selective fashion image signals of one of three colors to a D/A converter 28 connected to the contact point a of the switch 24. Thereafter, the image signals converted into analog form are sent to the CRT 16 through the switch 24 and an amplifier 29 to be displayed as a monocolor image.

Synchronizing signals provided by the CRT controller 23 are sent to a first deflection control circuit 30 to be transformed into vertical deflection signals $V_1$ and horizontal deflection signals $H_1$ shown in FIG. 6. These deflection signals $V_1$ and $H_1$ are sent to a deflection yoke coil 31 of the CRT 16 through the contact point a of the switch 25 to deflect an electron beam for scanning.

Figure 5:
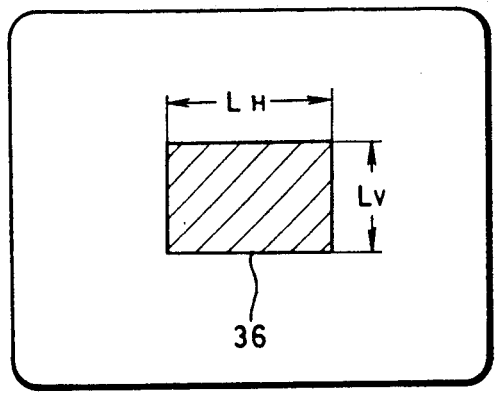
FIG. 5 is an illustration of the CRT screen when the photographic image printing system is selected.

When the synchronizing signal generating circuit 26 is actuated by the controller 22 as a result of the selection of the photographic printing mode, it generates horizontal and vertical synchronizing signals at a periodicity considerably shorter than that at which the synchronizing signals are generated by the CRT controller 23, and sends the signals to a second deflection control circuit 33. As shown in FIG. 7, the second deflection control circuit 33 transforms the synchronizing signals into vertical deflection signals $V_2$ and horizontal deflection signals $H_2$ which in turn are sent to the deflection yoke coil 31 of the CRT 16 through the contact point b of the switch 25. Since these deflection signals $V_2$ and $H_2$ have the same waveforms as parts of the deflection signals $V_1$ and $H_1$, respectively, as shown by the chained line in FIG. 7, the scanning angle of the electron beam is reduced to form a narrowed area 36 as shown in FIG. 5. Upon selecting the photographic printing mode as the switch 24 is brought into contact with the contact point b, luminance control signals are transmitted from a luminance controller 34 to the CRT 16 to control the luminance of an image displayed on the CRT 16.

Referring back to FIG. 1, in the photographic printer 1, there is a photographic processing section 37 which is well known. A cutter for cutting a processed photographic paper to predetermined lengths of paper strips, a color developing bath, a bleaching-fixing bath, a rinsing bath, a dryer drum, a cutter for cutting the processed paper strips to individual prints, etc. are provided in the printer 1. These elements are well known in the art and are not shown herein.

FIG. 1 shows the photographic printer 1 in the photographic image printing mode. A negative carrier 38, on which a color negative film 39 is positioned, is placed on the working table 14. Preferably, the color negative film 39 is pressed down by a masking frame 40 actuated by a solenoid (not shown) for printing.

Figure 2:
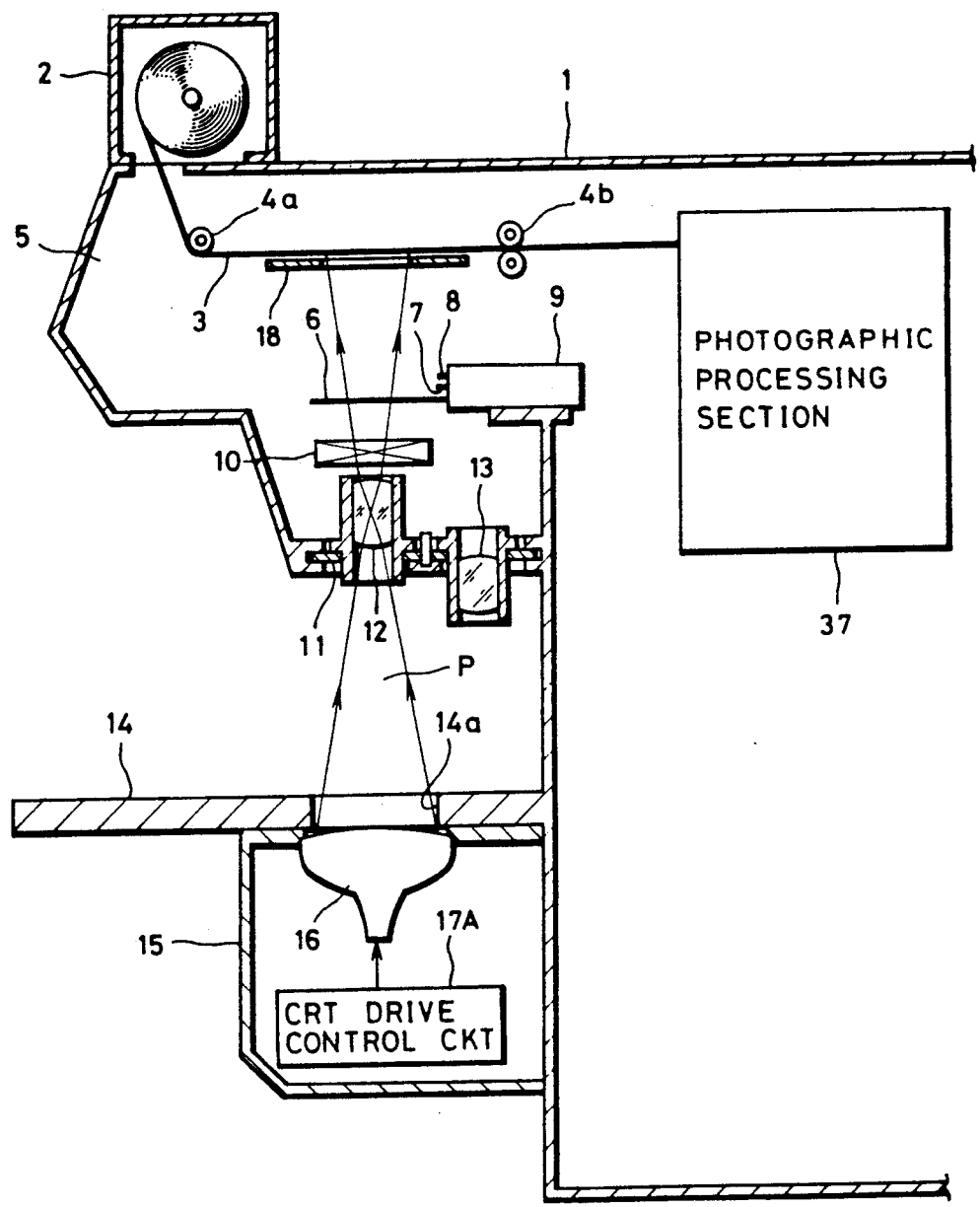
FIG. 2 is a schematic illustration of the photographic printer of FIG. 1 in which a video image printing system is selected.

In operation of the photographic printer of the video image printing mode as shown in FIG. 2, as a result of an operation of the keyboard a printing mode selecting signal is input to the controller for selecting the video image printing mode to turn the turret disk 11 to insert the video image printing lens 12 into the printing path P. When inputting a printing signal, the controller 22 brings the switches 24 and 25 into switching positions a respectively as well as actuating the CRT controller 23. Then, the CRT controller 23 reads out video image signals for three colors from the video RAM 21 and provides the first deflection control circuit 30 with synchronizing signals. The first deflection control circuit 30 generates vertical synchronizing signals $V_1$ and horizontal synchronizing signals $H_1$ as shown in FIG. 6 which in turn are transferred to the deflection yoke coil 31 through the switch 25 so as to controllably deflect the electron beam for scanning.

Figure 4:
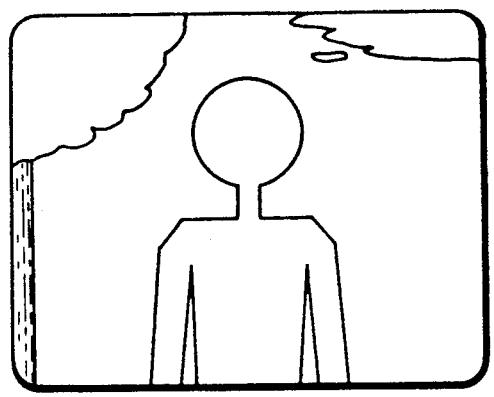
FIG. 4 is an illustration of a CRT screen when the video image printing system is selected.

On the other hand, image signals for red, green and blue for a single image frame in the video RAM 21 are read out in order of the arrangement of picture elements by the CRT controller 23 and are transmitted to the color selector 27. The color selector 27 retrieves image signals for, for example red and sends them to the D/A converter 28 in order to convert them into analog image signals. As was previously described, the analog image signals for red are sent to the CRT 16 through the switch 24 and the amplifier 29 to be displayed as a black-and-white image in a brightness pattern on the CRT 16. It is to be noted that, when the video image printing mode is selected, the synchronizing signals $V_1$ and $H_1$ are established so as to widen the deflection angle of the electron beam in order to form a raster image over all of the screen of the CRT 16, as shown in FIG. 4.

After passing through the opening 14a of the working table 14, the light emanating from the CRT 16 is focussed onto the color photographic paper 3. Because the red filter 6 is in the printing path P when a black-and-white image for red is disposed on the CRT 16, a red monocolor image is projected on the color photographic paper 3. If the shutter 10 is open for a proper time (for example one second) determined based on the light sensitivity to red of the color photographic paper 3, a red latent image is formed on the photographic paper 3. The red latent image is made small by using a reduction printing lens 12 to sharpen the image. If it is necessary to correct the density and/or color balance, brightness controller 34 is adjusted to produce the proper voltage for each other.

After the exposure for red, while the shutter 10 is closed and the red filter 6 is replaced by the green filter 7 in the printing path P. the color selector 27 is controlled to transfer the green image signals retrieved from the video RAM 21 to the CRT 16 after the conversion of the green image signals to analog form by the D/A converter 28. Therefore, the green image signals are displayed as a black-and-white image in a brightness pattern on the CRT 16. Immediately after the display of the black-and-white image on the CRT 16, the shutter 10 opens again for a certain time (for example one second), and the color photographic paper 3 is exposed to a green image to which the black-and-white image displayed on the CRT 16 is changed through the green filter 7, to form a green latent image over the red image therein. In the same way as for the red or green image, a blue latent image is formed over the red and green latent images in the photographic paper 3.

As described above, a color image of a video image is printed on the color photographic paper 3 in three color frame sequential exposing. Thereafter, one frame of the exposed color photographic paper 3 is withdrawn to place an unexposed part in the exposure position while sending the exposed part to the photographic processing section 37. After a predetermined number of frames of video images have been printed, the exposed part of the color photographic paper 3 is cut off in the form of a photographic paper strip and subjected to color developing, bleaching-fixing, rinsing and drying and, therein, is cut to individual prints.

FIGS. 1, 3 and 5 are useful for describing the operation of the photographic printer in the photographic image printing mode. For printing a negative film 39, the negative carrier 38 is placed in position on the working table 14. After setting a negative film 39 to be printed on the negative carrier 38, the keyboard is operated to selecte the photographic image printing mode. As a result the lens turret disk 11 turns to insert the photographic image printing lens 13 into the printing path P.

As shown in FIG. 3, when a printing signal is input to the controller 22, the controller 22 actuates the synchronizing generating circuit 26 while placing the switches 24 and 25 in switching positions b. Consequently, the luminance controller 34 provides the CRT 16 with luminance control signals to cause the CRT 16 to emanate light with a uniform brightness over its screen. On the other hand, the synchronizing signal generating circuit 26 produces synchronizing signals at said periodicity and sends them to the second deflection control circuit 33. As was previously described, the second deflection control circuit 33 provides vertical and horizontal synchronizing signals $V_2$ and $H_2$ which in turn are sent to the deflection yoke coil 31 through the switch 25. These synchronizing signals $V_2$ and $H_2$ control the deflection yoke coil 31 to deflect the electron beam to form a raster image area 36 on the CRT 16 bounded by vertical and horizontal lines $L_v$ and $L_h$ in FIG. 5. This raster image area 36 is defined to coincide with the image size of the color negative film 39.

For better color balance and color density, the filter changer 9 is actuated sequentially to insert the red green and blue filters 6, 7 and 8 into the printing path P for effecting an additive sequential exposure In the additive sequential exposure. exposure control is made by controlling the luminance of the CRT 16 with the brightness controller 34 while keeping the shutter speed of the shutter 10 constant. However, if the density of the color negative film 39 is out of the range of control by the available luminance of the CRT 16, the shutter speed may be changed. When a single image frame of the color negative film 39 is printed on the color photographic paper 3, one frame of the color photographic paper 3 is withdrawn from the magazine 2 to place an unexposed part thereon in the exposure position while the exposed part is moved to the photographic processing section 37 for processing in the same way as described for video image printing.

Figure 8:
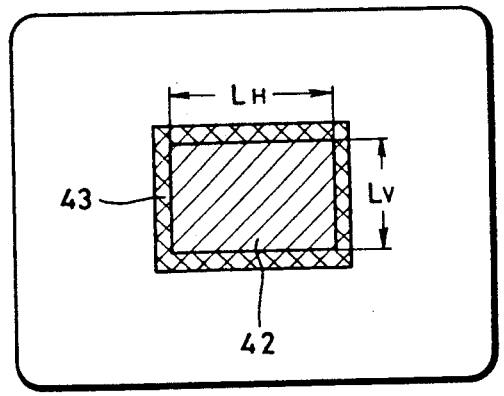
FIG. 8 is an illustration of a CRT screen on which a different raster area is defined.

In the photographic printer, because the raster area 36 defined on the screen is narrowed to increase the quantity of light emanating therfore, sticking may occur when the CRT 16 is continuously used for a long time. To prevent such sticking, it is desirable to form a framed area 43 shaded in FIG. 8 surrounding the narrowed raster area matching the size of the color negative film 39 and gradually to decrease, in an outward direction,, the luminance of the framed area 43.

Figure 9:
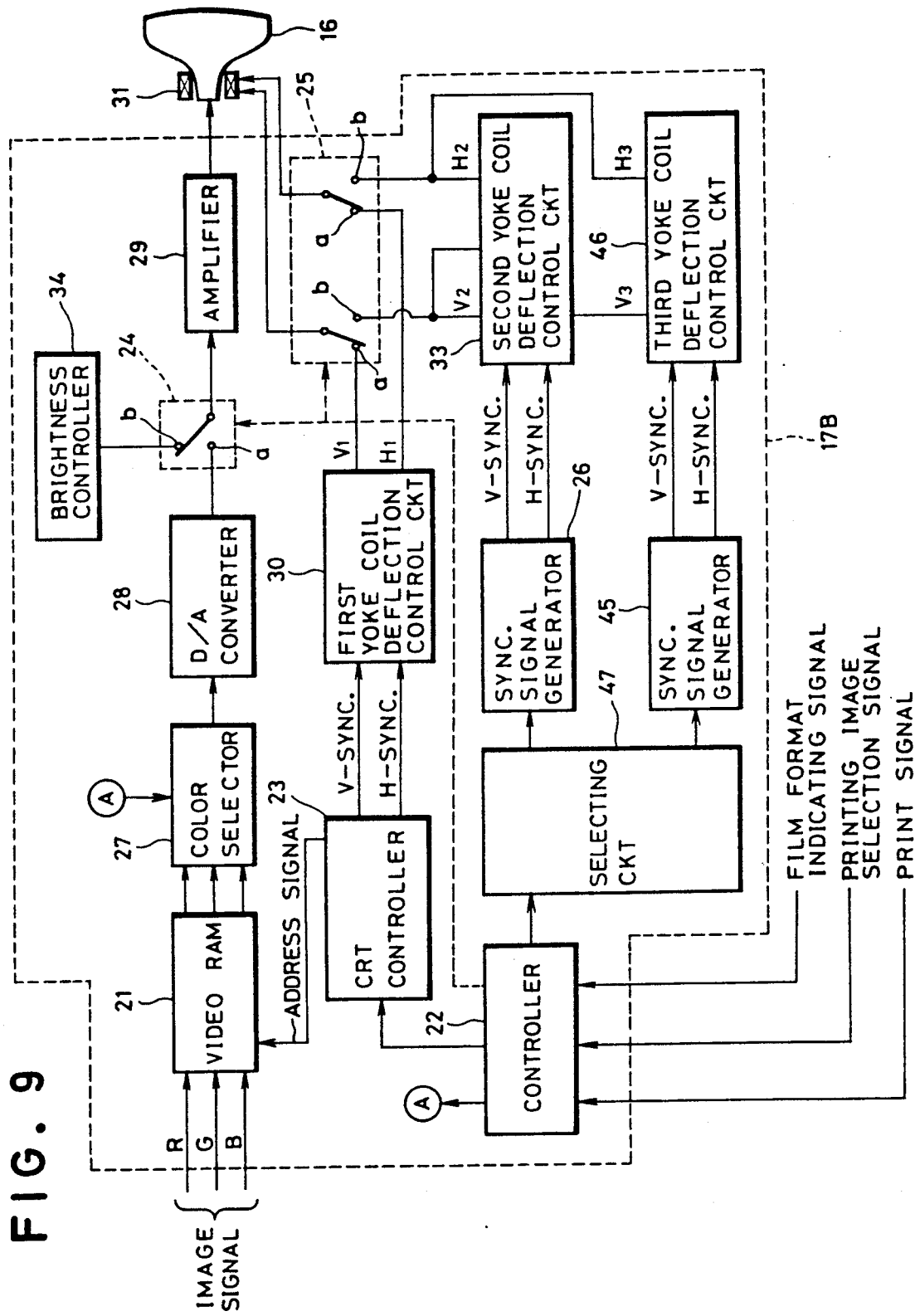
FIG. 9 is a block diagram showing a CRT drive circuit which can vary the raster area defined on the screen of the CRT.

FIG. 9 shows a CRT drive control circuit according to another preferred embodiment of the present invention which varies the raster image area in accordance with different film formats and in which similar parts are designated by the same reference numerals. In the CRT drive control circuit 17B, there is an additional synchronizing signal generating circuit 45 connected to an additional, third deflection control circuit 46 in parallel with the synchronizing signal generating circuit 26 and the second deflection control circuit 33. A selecting circuit 47 is positioned between the controller 22 and these synchronizing signal generating circuits 26 and 45.

In this CRT drive control circuit 17B when inputting a film format selecting signal into the controller 22, the selecting circuit 47 actuates the synchronizing signal generating circuits 26 or 45 according to a selected film format. If the photographic printer is available for a 35 mm full-size and a 35 mm half-size film format, the controller 22 selects the synchronizing signal generating circuit 26 for the 35 mm full-size format of film and the synchronizing signal generating circuit 45 for the 35 mm half-size format of film. When the synchronizing signal generating circuit 45 is selected, the third deflection control circuit 46 provides vertical and horizontal synchronizing signals $V_3$ and $H_3$ which in turn are sent to the deflection yoke coil 31 to form a half of the raster image area 36 shown in FIG. 5 which corresponds to the image area of the 35 mm half-size format of film. If desirable, there additionally may be provided synchronizing signal generating circuits and deflection control circuits, one for each of a plurality of other formats of films such as brownie films, a 110-size format of films, etc., other than the 35 mm size format of films.

Figure 10:
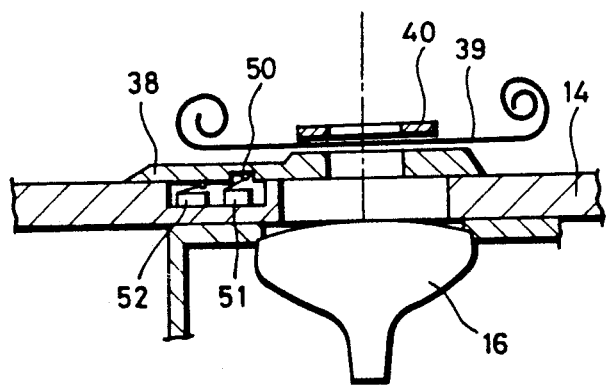
FIG. 10 is a photographic printer according to another preferred embodiment of the present invention in which a film format is set in cooperation with the setting of a negative carrier.

FIG. 10 shows an example of the negative carrier 38 which is adapted to input automatically a film format selecting signal into the controller 22. As shown the negative carrier 38 has a code notch 50 located in at least one of two different code positions on its underside. Two switches 51 and 52 on the working table 14 correspond to the code positions of the negative carrier 38, and detect the presence or absence of the code notches 50. The presence or absence of a code notch in each of the two possible code positions defines a two-bit-binary number which represents a film format for which the negative carrier is used. The negative carrier 38 is shown as having one code notch to turn off the switch 51 and turn on the switch 52 to provide a film format selecting signal representing, for example, 35 mm full-size format in the negative carrier 38. The switches may be replaced with reflection type photosensors. It is convenient to provide a sensor for detecting the setting of a negative carrier to provide a sensor for detecting the setting of a negative carrier to provide a signal as a printing mode selecting signal for selecting the photographic image printing mode.

Figure 11:
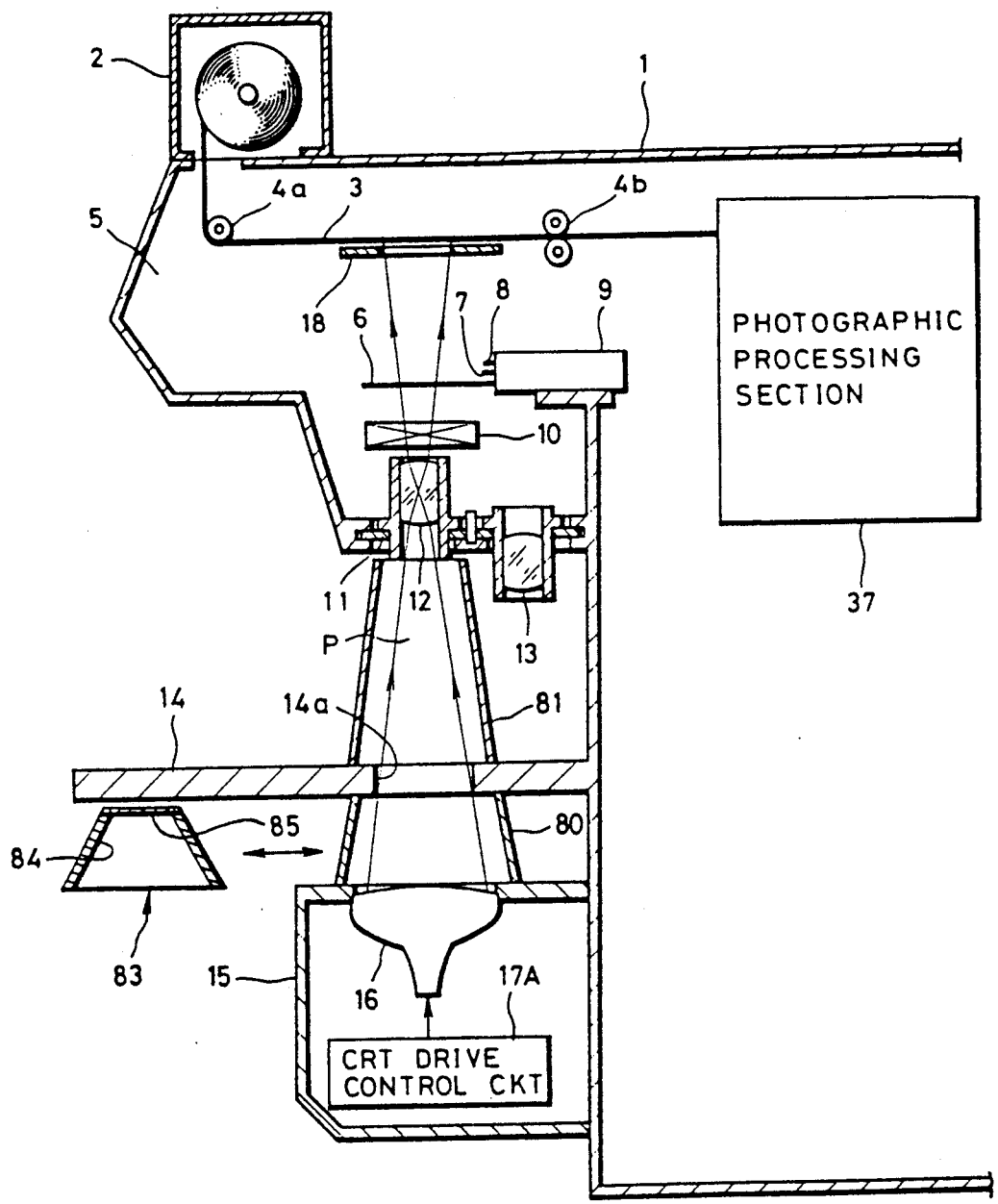
FIG. 11 is a schematic illustration of a photographic printer according to still another preferred embodiment of the present invention in which light collecting means are incorporated.

FIG. 11 shows a photographic printer according to another preferred embodiment of the present invention. In this embodiment, the photographic printer itself is the same in construction and function as that of FIG. 1 and 2 except that there is a space between the working table 14 and the CRT unit 15. As shown, when the video image printing system is selected, light shielding tubes 80 and 81 are used. These light shielding tubes 80 and 81, both having a frusto-pyramidal cross section, are removably disposed between the working table 14 and CRT unit 15, and between the working table 14 and the turret disk 11, respectively. These light shielding tubes 80 and 81 have an inner surface painted black and serve to prevent ambient light from falling onto the screen of the CRT 16.

When the photographic image printing system is selected, these light shielding tubes 80 and 81 are replaced with a light collecting tube or mirror box 83 which is displaced between the working table 14 and the CRT unit 15. This mirror box 83 is formed in the form of a frustum pyramid with mirrored inner walls 84 and a top diffusion plate 85 which maybe made by a material such as a white acrylic plate. The diffusion plate 85 is smaller than the bottom end of the frustum pyramid, and about equal to opening of the negative carrier 38, for collecting light from the CRT 16. Since the light passed into the mirror box 83 from the CRT 16 which forms a raster image over all of the CRT screen thereof, is sufficiently collected and mixed and diffused. the color negative film 39 is illuminated with a uniform illumination light. It is noted that the CRT 16 may illuminate a small area in the photographic printing mode.

In any embodiment described above, although the photographic printer is adapted to print one frame for every exposure in the photographic image printing system, it may be possible to print more than one frame at once. This can be done by forming, either separately or continuously, two raster areas to illuminate two frames on the photographic films. Various photographic materials other than color photographic papers may be held, such as reversal films. A zoom printing lens may be used in place of different lenses for each of video image printing and photographic image printing. The present invention also can be embodied in black-and-white photographic printers without the provision of color filters.

Although the present invention has been fully described by way of preferred embodiments thereof with reference to the accompanying drawings, various changes and modifications within the spirit of the invention will be apparent to those of ordinary skill in the art. Therefore, the scope of the present invention is limited only by the appended claims which follow immediately.

What is claimed is:

1. A photographic printer for making prints according to alternative video image printing and film negative image printing systems, said printer comprising:
    a CRT for outputting an illuminated raster area on a phosphor screen according to an electron beam;
    a video image printing system for making a print of a video image displayed on said phosphor screen of said CRT;
    a film negative image printing system using said CRT as an illumination light source for making a print of an image frame of a film negative; and
    deflection angle changing means for changing an angle of deflection of said electron beam of said CRT such that, for said film negative image printing system, a raster area on said phosphor screen is varied to a size smaller and a raster density greater than a size and density of a raster area for said video image printing system, said raster area for said film negative image printing system corresponding to the size of said single image frame of said film negative for making said print of said image frame of said film negative.

2. A photographic printer as defined in claim 1, further comprising a light shielding tube for preventing ambient light from falling onto the phosphor screen of the CRT and for limiting light from affecting a print produced with said video image printing system, said light shielding tube being removably disposed on a working table when said video image printing system is used.

3. A photographic printer as defined in claim 1, wherein said deflection angle changing means includes means for changing said angle of deflection of an electron beam of said CRT in accordance with an indicated film negative format.

4. A photographic printer as defined in claim 3, further including a negative carrier which includes means for indicating said film negative format.

5. A photographic printer as defined in claim 4, said indicating means including code notches provided on said negative carrier.

6. A photographic printer as defined in claim 1, wherein said deflection angle changing means includes means for changing said angle of deflection of said electron beam to form a marginal raster area larger than said raster area of said film negative image system, said marginal raster area having a border whose luminance gradually decreases in a direction away from a center of said marginal raster area.

7. A photographic printer as defined in claim 2, wherein said deflection angle changing means includes means for changing said angle of deflection of said electron beam to form a marginal raster area larger than said raster area of said film negative image system, said marginal raster area having a border whose luminance gradually decreases in a direction away from a center of said marginal raster area.

8. A photographic printer as defined in claim 3, wherein said deflection angle changing means includes means for changing said angle of deflection of said electron beam to form a marginal raster area larger than said raster area of said film negative image system, said marginal raster area having a border whose luminance gradually decreases in a direction away from a center of said marginal raster area.

9. A photographic printer as defined in claim 4, wherein said deflection angle changing means includes means for changing said angle of deflection of said electron beam to form a marginal raster area larger than said rater area of said film negative image system, said marginal raster area having a border whose luminance gradually decreases in a direction away from a center of said marginal raster area.

10. A photographic printer as defined in claim 5, wherein said deflection angle changing means includes means for changing said angle of deflection of said electron beam to form a marginal raster area larger than said raster area of said film negative image system, said marginal raster area having a border whose luminance gradually decreases in a direction away from a center of said marginal raster area.

11. A photographic printer having as alternative printing systems, a CRT image printing system for making a print of a video image displayed on a phosphor screen of a CRT by projecting the video image on photographic paper, and a photographic film negative image printing system using said CRT as an illumination light source for alternatively making a print of an image frame of a film negative, said photographic printer comprising:
 a table stationarily disposed under the photographic paper;
 a CRT unit disposed below said table and housing the CRT;
 a film negative carrier removably disposed on said table for holding said film negative when said photographic film negative image printing system is used;
 a mirror box, removably disposed between said table and said CRT unit when said photographic film negative image printing system is used, for collecting and directing the light emitting from said CRT toward said film negative on said film negative carrier; and
 means for driving said CRT to emit white light according to a raster area smaller in size and greater in density than a raster area when said CRT image printing system is used, for illuminating said film negative when said photographic film negative image printing system is used.

12. A photographic printer as defined in claim 11, wherein said mirror box is shaped in the form of a frustum pyramid having mirrored inside walls.

13. A photographic printer as defined in claim 11, further comprising two light shielding tubes for preventing ambient light from falling onto the phosphor screen of the CRT and for limiting light from affecting a print produced with said video image printing system, said two light shielding tubes being removably disposed on and under the table when said video image printing system is used.

* * * * *